(12) United States Patent
Pité et al.

(10) Patent No.: US 6,765,884 B1
(45) Date of Patent: Jul. 20, 2004

(54) APPARATUS AND PROCESS FOR TRANSMITTING A DECEITFUL SIGNAL TO A MOBILE PHONE

(75) Inventors: Éric Pité, Birmingham (GB); Marchand Pierre, Courbevoie (FR); Adrien Desportes, Paris (FR)

(73) Assignee: SAGEM SA, Paris (FR)

( * ) Notice: Subject to any disclaimer, the term of this patent is extended or adjusted under 35 U.S.C. 154(b) by 716 days.

(21) Appl. No.: 09/626,507

(22) Filed: Jul. 27, 2000

(30) Foreign Application Priority Data

Jul. 29, 1999 (FR) .............................................. 99 09870

(51) Int. Cl.[7] .................................................. H04Q 7/00
(52) U.S. Cl. .................................... 370/328; 455/422.1
(58) Field of Search ................................ 370/310, 315, 370/316, 319–321, 324, 328, 329, 331, 332, 335, 342; 455/7, 11.1–13.2, 13.4, 20

(56) References Cited

U.S. PATENT DOCUMENTS 3,987,396 A * 10/1976 Kreger .......................... 455/19
4,539,706 A * 9/1985 Mears et al. ................ 455/11.1
5,937,332 A * 8/1999 Karabinis ................... 455/12.1
6,285,878 B1 * 9/2001 Lai ............................. 455/431

FOREIGN PATENT DOCUMENTS

EP          0 880 296         11/1998
WO        WO 99/18688         4/1999

* cited by examiner

*Primary Examiner*—John Pezzlo
*Assistant Examiner*—David Odland
(74) *Attorney, Agent, or Firm*—Patterson, Thuente, Skaar & Christensen, P.A.

(57) ABSTRACT

To eliminate the acoustic nuisance caused by a ringing of a mobile telephone (1) in a limited geographical zone (7), a device (8) for the transmission of a signal (9) is placed in this zone (7). The decoy signal (9) is obtained by identifying the radioelectric synchronization signal (10), received by a receiver (11), that is the most powerful signal transmitted in this zone (7) and by producing a replica of this synchronization signal (10). This replica is amplified and desynchronized with respect to the received signal (10). Thus a mobile telephone (1) present in this zone (7) considers this decoy signal (9) to be the most powerful one and will therefore get connected with the dummy transmitter (12) that transmits this dummy signal (9). Thus, the production of acoustic nuisance in this zone (7) is avoided.

9 Claims, 3 Drawing Sheets

APPARATUS AND PROCESS FOR TRANSMITTING A DECEITFUL SIGNAL TO A MOBILE PHONE

BACKGROUND OF THE INVENTION

1. Field of the Invention

An object of the present invention is a device for the transmission of a decoy signal. It also relates to a method for the transmission of a decoy signal. It can be applied in the field of mobile telephony, especially to mobile telephones working according to a standard or specification for which a CDMA type access protocol is envisaged. Standards or specifications using such protocols include the IS95 standard or the IMT2000 standard or more particularly the UMTS standard. More generally, the invention can be applied in transmission/reception systems for which, in a synchronization phase, measurements are made of a power value of a received signal. These measurements of power values are used to select the most powerful encoded signal from among all the encoded signals received, an encoded signal being obtained through the use of a spread-spectrum technology. The aim of the invention is to make a device for the transmission of a decoy signal, thus simulating the presence of a base station in a limited geographical zone with which a mobile telephone gets connected, the mobile telephone being within a limited geographical zone. The aim of the invention also relates to a method for the transmission of a decoy signal that is implemented especially in the device of the invention.

2. Description of the Prior Art

At the present time, the deployment of a mobile telephony network, especially in a town, enables a mobile telephone to get connected to this network from almost any place whatsoever. Thus, a user can freely access a mobile telephony network through a mobile telephone, but it is also possible to contact this user in any place whatsoever.

This free access from any place whatsoever raises problems. Indeed, there are places where silence is necessary depending on the activities being performed in this place. This is especially so in places of entertainment where any sound, other than that produced by the show itself, is considered to be an acoustic nuisance. These entertainment halls are generally cinema halls, opera halls, concert halls or again auditoriums. This may also be the case in conference rooms, lecture rooms and lecture halls. An acoustic nuisance in a place of this kind usually results from the ringing of a mobile telephone. Thus, a mobile telephone that rings in a place like this disturbs an established ambience by creating an acoustic nuisance.

There are known ways of sending a decoy signal to a mobile telephone so that it does not ring in public places such as this. However, in these known applications, a call is set up according to a protocol between a mobile telephone and a base station. This call is often complicated and difficult to implement because the base station has to send special messages which must be acknowledged or not acknowledged by the mobile telephone. Furthermore, the mobile telephone has to be modified so that it can interpret this protocol in order to find out whether or not it is in a place of this kind.

It is an object of the present invention to overcome these problems of acoustic nuisance by proposing a device for the transmission of a decoy signal used as a synchronization signal by a mobile telephone which is in a place to be protected against acoustic nuisance from a mobile telephone. In the invention, a mobile telephone, in a zone to be protected against an acoustic nuisance, will get connected with a device for the transmission of a decoy signal. Thus, a fictitious base station is created. This fictitious base station has certain elementary characteristics of a real base station with which the mobile telephones, which are present in the limited geographical zone, will get connected.

Furthermore, the device and the method of the invention use prior art mobile telephones that work according to a CDMA type access protocol. With this type of access protocol, a connection phase with a base station consists, inter alia, of a measurement of power of a received signal. The mobile telephone gets connected with the base station that sends the signal whose power, at reception by the mobile telephone, is the highest possible power.

SUMMARY OF THE INVENTION

The present invention therefore relates to a method for the transmission of a decoy signal, which is a radioelectric mobile telephony signal according to a CDMA type access protocol, in a limited geographical zone, wherein:

a measurement is made, by means of a dummy receiver, in the limited geographical zone, of the power of one or more synchronization signals received in this limited geographical zone and transmitted by base stations of a mobile telephony network, a candidate signal is chosen from among the synchronization signals received for which the power value is the greatest in the limited geographical zone, the receiver is temporally synchronized with the received signal, a decoy signal that is the replica of the chosen signal is produced, the decoy signal is amplified up to a power value that is strictly greater than a power value of the chosen signal, the decoy signal is sent inside the limited geographical zone by means of a dummy transmitter, the decoy signal being temporally desynchronized with respect to the chosen signal and the other candidate radioelectric signals, a mobile telephone is radioelectrically connected with the dummy transmitter, the mobile telephone being inside the limited geographical zone.

The invention also relates to a device for the transmission of a mobile telephony radioelectric decoy signal in a limited geographical zone comprising a dummy receiver and a dummy transmitter sending a signal that is desynchronized with respect to the signal received by the dummy receiver and is more powerful than this received signal.

BRIEF DESCRIPTION OF THE DRAWINGS

The invention will be understood more clearly from the following description and the appended figures. These figures are given purely by way of an indication and in no way restrict the scope of the invention. Of these figures.

DETAILED DESCRIPTION OF THE INVENTION

Figure 1:
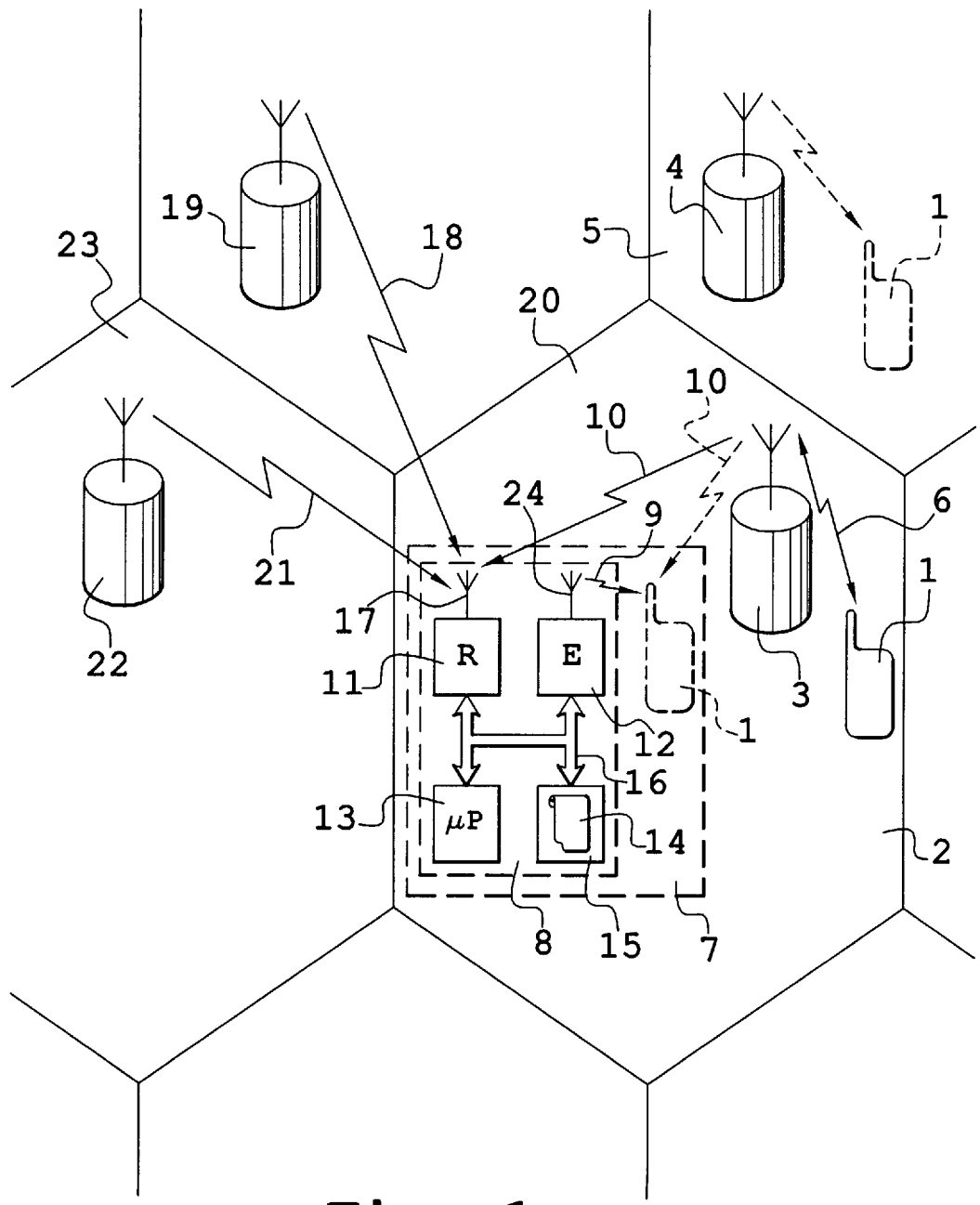
FIG. 1 gives a schematic simplified view of a use of the device of the invention.

FIG. 1 is a schematic simplified view of a use of the device of the invention. This figure gives a view, in a prior art operation, of a mobile telephone 1 geographically located inside a cell 2. The cell 2 represents a geographical zone in which a base station 3 is transmitting. The mobile telephone 1 may be connected radioelectrically with the station 3 from any place whatsoever in the cell 2. A territory is divided into a multitude of geographical zones, each being associated with a cell such as the cell 2. Thus, when the mobile telephone 1 is outside the cell 2, it is radioelectrically connected with a station 4 of a neighboring cell 5.

A synchronization radioelectric signal 6 is sent by the station 3. The signal 6 is sent in accordance with a CDMA (code division multiple access) type access protocol. This means that several users can share the same physical transmission channel because the transmitted signal is encoded by a code that differentiates it from the others. This code is generally a pseudo-random binary sequence whose properties are such that the intercorrelation of the sequence with a version that is itself temporally shifted, or with a different sequence from the same family, is zero. The term used in this case is "orthogonal codes". This mutual orthogonality of the codes is used to send several signals encoded in this way, simultaneously or on one and the same carrier frequency. To reconstruct a signal from the knowledge of the original code that is associated with it, all that is needed is to perform an intercorrelation between the received signal and this original code. If the received signal is encoded with a code different from the original code, then the result of the correlation is negligible when compared with the result obtained when the codes correspond. Thus, in the case of a multitude of received signals, all the signals encoded with codes different from the original code are cancelled, apart from the noise, during the intercorrelation. This is the principle of the detection of one signal among many signals in a CDMA context.

In the invention, the mobile telephone 1 receives a signal 6 coming from the station 3 when it is in the cell 2. The mobile telephone 1 furthermore receives signals coming from base stations located in adjacent cells such as the station 4. During a connection phase, the mobile telephone 1 chooses a signal from among the received synchronization signals. A received candidate signal is a signal sent by a base station. Thus, the mobile telephone 1 receives a radioelectric signal which is a superimposition of received candidate signals.

In the context of the UMTS standards, a sent signal consists of a temporal succession of messages. A message is sent during a time interval of a fixed duration, a time interval defining a temporal window hereinafter called a slot. A duration of one slot is approximately 0.615 ms. A succession of slots, generally sixteen of them, is assembled to give a frame. To be able to read the information sent in a slot, the mobile telephone must identify the start of a slot and the start of a frame. A synchronization phase is necessary.

The station 3 sends a first synchronization channel SCH. This station 3, at each start of a slot, sends a primary synchronization code for a period of about 10% of the duration of the slot. This primary synchronization code is the same for all sixteen slots. These are codes generally known as GOLD codes. A GOLD code is a code obtained by a combination between two pseudo-random sequences of maximum length that are known as m-sequences. The start of a slot is found by obtaining successive correlations between a received signal and the primary synchronization code known to the mobile telephone 1. The temporal position of the correlation peak indicates the start of a slot.

By the same principle, a start of a frame is detected by correlating received signals with secondary synchronization codes sent in a second synchronization channel SCH. The position of the secondary synchronization codes is known since the starting date of a slot is known. In this second channel SCH, each start of a slot bears a secondary synchronization code. In the duration of a frame, at least two codes of the channel are different. The second channel SCH therefore has a series representing a combination of sixteen secondary selected synchronization codes out of seventeen possible secondary synchronization codes. Each series thus formed corresponds to a group of codes out of thirty-two. A search is made, by successive correlation with the thirty-two groups of possible codes, for the group of codes for which a correlation value is the greatest. A start of a frame is identified after the identifying of the group of codes used and therefore the order in which the secondary synchronization codes are arranged.

Data sent by the station 3 is shuffled according to a shuffling code among 512 for example. This code is sent by the station 3 to a CCPCH (common control physical channel). Each group of secondary codes has a set of sixteen shuffling codes associated with it. Correlations are made between a shuffling code out of sixteen and a signal received by the CCPCH channel. As earlier, the shuffling code for which a correlation value is the greatest is chosen. Once this shuffling code is determined, the mobile telephone 1 can read information received especially by means of a broadcast channel BCH. The broadcast channel revives broadcast information pertaining especially to the identification of the receiver 3. The primary synchronization code, secondary synchronization code, group code and shuffling code are, in a preferred example, GOLD or even KASAMI codes. A KASAMI code is a combination between a GOLD code and a fraction of the m-sequences which are at the origin of this GOLD code.

In the cell 2, a definition is given of a limited geographical zone 7 with dimensions smaller than those of the cell 2. It is sought, in this zone, to eliminate any acoustic nuisance due to the presence of the mobile telephone 1. For this purpose, a device 8 is placed in the zone 7. This is a device for the transmission of a signal 9. In this zone 7, the mobile telephone receives the decoy signal 9 in addition to the signal 10 emitted by the station 3.

The device 8 has a dummy receiver 11 and a dummy transmitter 12 as well as a microprocessor 13 and a program 14 in a program memory 15, all these elements being connected together by a control, data and address bus 16.

In the invention, the receiver 11 measures a power value of one or more received synchronization signals in the zone 7. In one example, the receiver 11 receives the signal 10 from the station 3 at an antenna 17 but also a signal 18 from a station 19 in an adjacent cell 20 as well as a signal 21 from a station 22 in an adjacent cell 23. In this example, the stations 3, 19 and 22 appear at the same mobile telephony network. After correlation by the primary synchronization codes, the program 14 chooses a candidate signal among the received synchronization signals, for which the power value is the greatest, among the signals 10, 18 and 21. Since the zone 7 is in the cell 2 which is associated with the station 3, the candidate signal seen as being the most powerful one is the signal 10.

Once the signal 10 is chosen the receiver 11 gets temporally synchronized with the received signal 10. This synchronization phase is the same as the one where the mobile telephone 1, in the cell 2 but outside the zone 7, gets synchronized with the base station 3. The microprocessor 13 then controls the transmitter 12 to make it produce the signal 9 which comprises at least the primary synchronization code and a secondary synchronization code. Before transmission, the signal 9 is amplified up to a value strictly higher than the value of the power of the signal 10. Furthermore, a temporal shift is added to the signal 9 so that it is no longer synchronized with the signal 10 but also with respect to the other signals 18 and 21. Thus, not only does the receiver 11, in performing the correlations by means of the primary synchronization code, perceive the signal 9 as being more powerful than the signals 10, 18 and 21 but, in addition, there is no risk of confusion since the program 14 has temporally shifted the signal 9 in such a way that its correlation peak is not superimposed with any other of the correlation peaks of the signals 10, 18 or 21.

The program 14 also records the power and temporal shift applied to the signal 9 so that the receiver 11, during its regular measurements of the power of the signals sent by the neighboring stations, does not take account of the decoy signal 9.

This signal 9 is sent by means of an antenna 24 of the transmitter 12. Therefore, the telephone 1, in the zone 7, selects the signal 9 and thus considers the device 8 to be the base station with which it must be connected. The signal 9 includes the information by which the mobile telephone 1 can get synchronized with the fictitious base station (primary and secondary synchronization codes) as well as the elementary information from a fictitious channel BCH that is indispensable if the mobile is not to go seeking a better base station. It all happens for the mobile telephone 1 as if, in moving into the zone 7, it goes from the cell 2 to a neighboring cell demarcated by the dimensions of the zone 7. One difference between the device 8 and a base station is that the device 8 sends no incoming call to the mobile telephone 1. In this case, the mobile telephone 1 does not ring because it is in the zone 7 thus preventing the production of acoustic nuisance in this zone 7. Furthermore, the signal 9 contains no acknowledgment information in response to a possible request by the mobile 1 to let through a call. In one variant, it may have an information ordering the mobile to get turned off.

It is possible, in one variant, to envisage a case in which, to enable a mobile telephone to change a base station, a mobile telephony network must identify the two base stations concerned by this change. After this identification, the network may authorize the change. Thus, in this variant, the device 8 is radioelectrically connected with a mobile telephony network. In this case, the mobile telephony network may identify the device 8 and authorize the mobile telephone to get connected with the device 8.

In a preferred variant, the device 8 of the invention manages requests for calls from the mobile telephone 1. To do so, when the mobile telephone 1 sends a request for a call to the device 8 which it believes to be a base station, the transmitter 12 sends a signal indicating that a link to the correspondent asked for by the mobile telephone 1 is busy. It is equally possible to send a signal representing a ring to a correspondent. In this preferred variant, the transmitter 12 comprises a reception device (not shown) to receive a call request from the mobile telephone 1.

In a first application of the invention, it is assumed that the device 8 will be positioned on a fixed support in the zone 7. The zone 7 generally corresponds to a room in a building but may very well correspond to a space external to any building. Thus, the device 8 of the invention can be positioned in any place that has to be immunized against acoustic nuisance from a mobile telephone.

Figure 2:
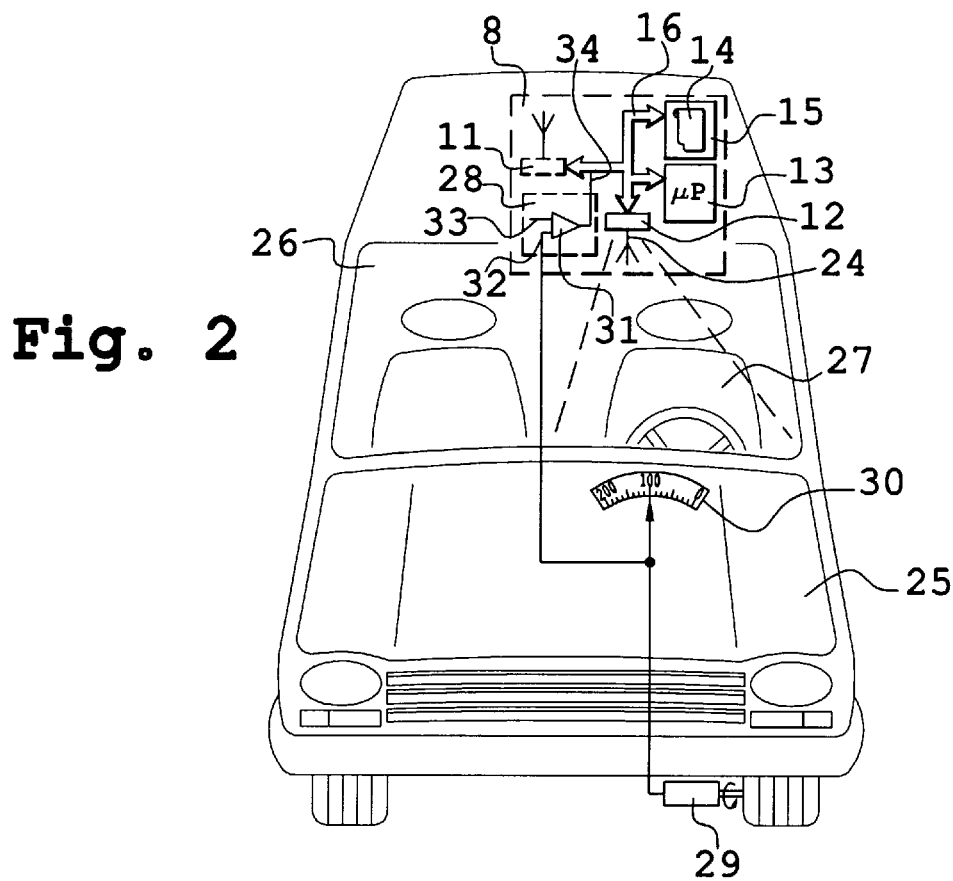
FIG. 2 is a drawing of a vehicle comprising the device of the invention.

FIG. 2 shows a vehicle 25 comprising the device 8 of the invention. The vehicle 25 has a body 26. In this body 26, the zone 7 of FIG. 1 is represented by a zone 27 corresponding to a part of this body 26. In a preferred example, the zone 27 covered by the transmitter 12 of the device 8 covers an area in which there is a driver of the vehicle 25.

In order to limit a transmission of signals by the transmitter 12 to a zone corresponding to the zone 27, or the zone 7 of FIG. 1, the antenna 24 in a preferred variant is a sectorized and/or directional transmission antenna. A sectorized and/or directional antenna is an antenna with which transmission can be made in a preferred direction. A choice of the antenna 24 type depends on the shape of the limited geographical zone to be covered. Furthermore, the transmitter 12 has means (not shown) such as a variable gain amplifier, for example, to adjust the transmission power of a decoy signal. Indeed, the power value of a signal sent by the transmitter 12 depends on the dimensions of the zone 27 or the zone 7 (FIG. 1) as the case may be.

In general, and in the preferred example, the vehicle 25 is a automobile such as a car, a truck or a bus. However, it is quite possible to place the device 8 in a train driver's cabin, an aircraft pilot's cockpit or again a ship's navigation cabin. The device 8 may therefore be positioned in any vehicle that can move under the control of a driver or pilot, where the driver or pilots, especially for safety reasons, should never be distracted by the untimely ringing of a mobile telephone.

In a preferred example, the transmitter 12 is activated or not activated depending on whether the vehicle 25 is moving or not moving respectively. For this purpose, the device 8 has a means 28 for detecting a movement of the vehicle 25. To detect a movement, it is possible to use a piece of information on speed produced by a tacho generator 29 and sent to a speedometer or speed indicator 30. Should the vehicle 25 be an automobile, the generator 29 detects a wheel motion. Thus, the means 28 or detector 28, in one example, has a comparator 31 with two inputs 32 and 33 and one output 34. The input 33 is connected to a current reference or voltage reference, for example equal to zero volts, and the input 32 is connected to an output of the generator 29. When the vehicle 25 has stopped, the generator 29 gives no electrical voltage whereas if the vehicle 25 is moving then the generator 29 produces a voltage. The comparator 31 detects or does not detect the presence of a voltage at the input 32. Through the output 34 connected to the bus 16, the comparator 31 sends the microprocessor 13 a piece of information on the presence or non-presence of an electrical voltage at output of the generator 29. More generally, the detector 28 has means to detect whether the vehicle 25 is in motion. When the transmitter 12 is deactivated, it becomes possible for a user in the zone 27 to receive or send a call.

In one variant, the transmitter 12 is activated or not activated depending on whether the mobile telephone 1 is associated or not associated with a hands-free kit. For this purpose, the detector 28 detects the presence of a hands-free kit (not shown) and its use. Thus, the transmitter 12 is deactivated when the mobile 1 is positioned in the hands-free kit.

Whatever the place in which the device 8 is located, a mobile telephone outside this zone 7 or 27 should not detect the presence of the transmitter 12 or at least should not get connected to this transmitter 12. In a first approach, the transmitter 12 is provided with a sectorized and and/or directional antenna 24. In a second approach, which may or may not be a complement to the first approach, a volume of the limited geographical zone is demarcated by an electromagnetic shield.

Figure 3:
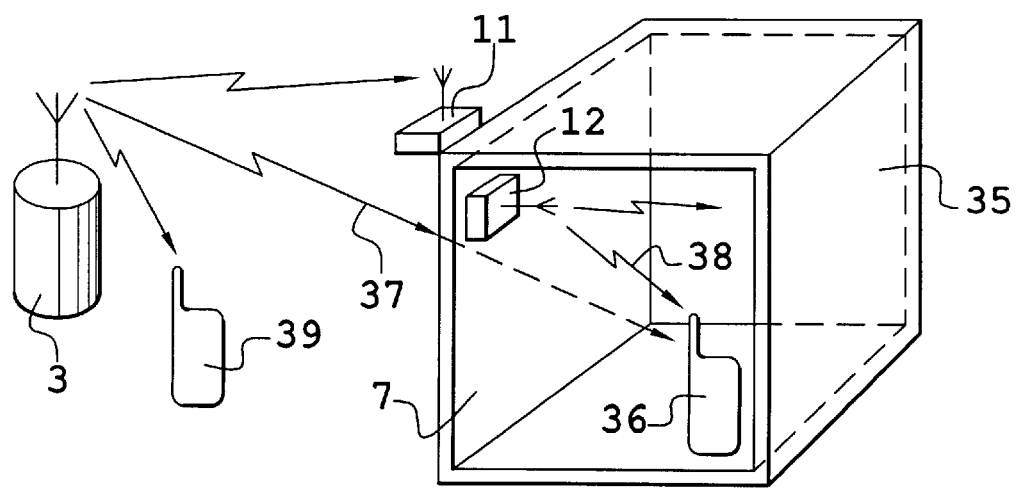
FIG. 3 shows a use of the device of the invention in a limited geographical zone delimited by an electromagnetic shield.

FIG. 3 shows a schematic view of the this second approach. Thus, a volume of the zone 7 of FIG. 1 is demarcated by an electromagnetic shield 35. The transmitter 12 is placed inside the shield 35 and the receiver 11 outside the shield 35. A mobile telephone 36 placed inside the shield 35 will therefore not receive a signal 37 from the base station 3 or, depending on a quality of the shield 35, the mobile telephone 36 will receive the signals 37 but in an attenuated form. Similarly, a signal 38 sent by the transmitter 12 is contained in the zone 7 demarcated by the shield 35. If the signal 38 manages to cross the shield 35, it will be excessively attenuated so that a mobile telephone 39, outside the zone 7, can select the signal 38 and therefore get connected with the transmitter 12.

An exemplary embodiment of the shield 35 uses a metallic, grid structure in which the holes have a size of about the wavelength of the signal 38 sent by the transmitter 12. This is generally a Faraday cage. The shield 35 provides for a possibility of giving a more precise demarcation of the geographical boundaries of the zone 7 with respect to a use only of a sectorized and/or directional antenna 24. A combination of these two approaches gives a demarcated zone 7.

Figure 4:
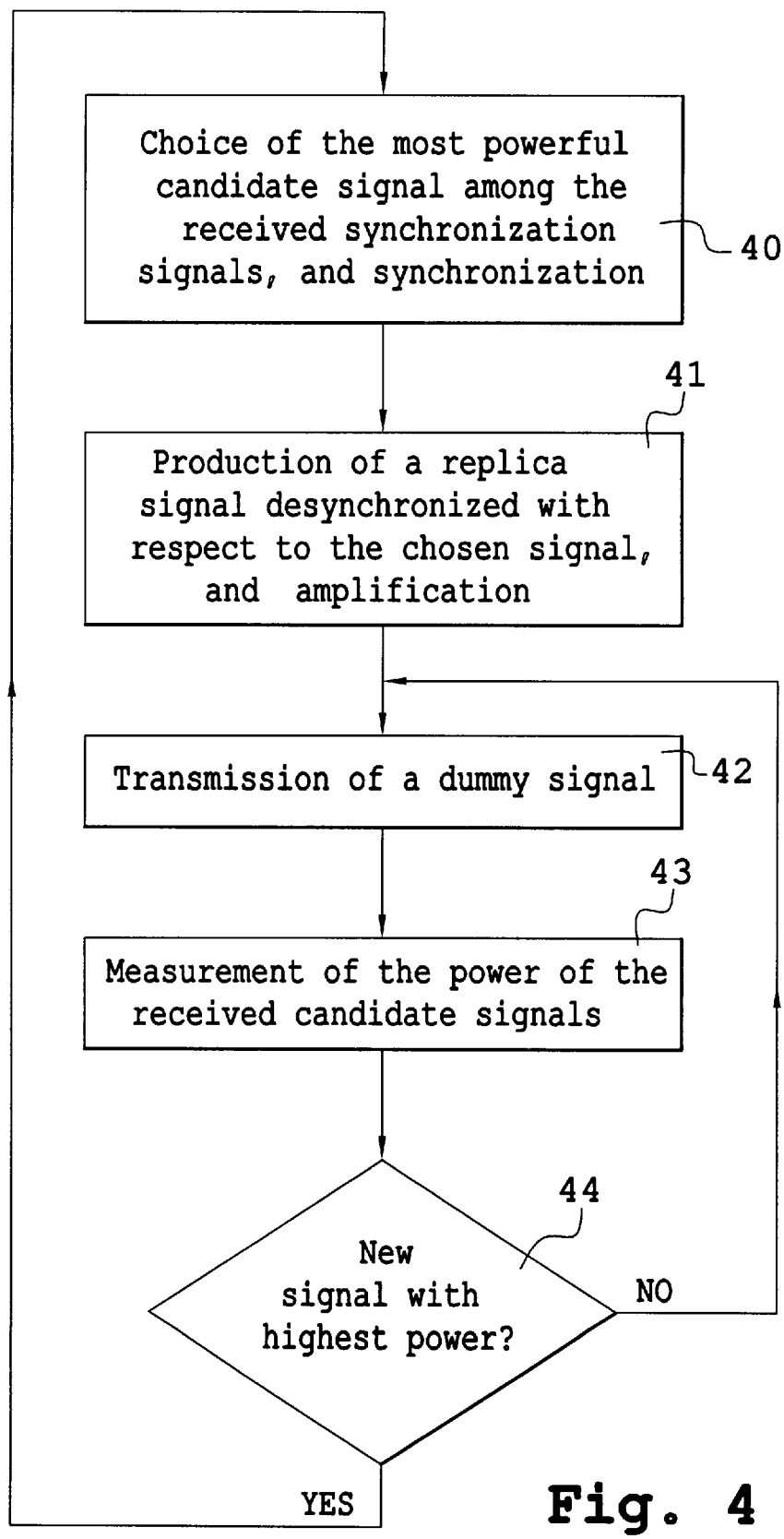
FIG. 4 is a view in the form of an algorithm of the method of the invention.

FIG. 4 gives a view, in the form of an algorithm, of a depiction of an operation of the method of the invention. In a step 40, the receiver 12 receives the synchronization signals 10, 18 and 21 at its antenna 17. Then, the most powerful candidate signal of these received signals is measured, for example the signal 10. The microprocessor 13 then synchronizes the receiver 11 on this signal. For this purpose, the microprocessor 13 performs correlation computations with a primary synchronization code, secondary synchronization codes and a group of codes.

Once the synchronization is set up, the microprocessor 13 activates this transmitter 12 in a step 14 to produce a replica signal synchronized with the signal 10 and comprising the same primary synchronization code, the same secondary synchronization codes and the same group of codes as are in the chosen candidate signal. The transmitter 12 then amplifies this signal and adds a temporal shift to it so that it is desynchronized from the signal 10 to form the decoy signal 9.

In one variant, the replica signal comprises a primary synchronization code, secondary synchronization codes and a group of codes different from those of the candidate signal chosen and are proper to it.

In a step 42, the transmitter 12, with its antenna 24, sends the signal 9 to a zone 7 or 27 for which it is sought to eliminate acoustic nuisance caused by the untimely ringing of the mobile telephone 1.

In a step 43, the microprocessor 13 carries out power measurements of the signals received by the antenna 17 of the receiver 11, without including its measurements of the signal 9 sent by the transmitter 12 in its count.

In a testing step 44, the microprocessor 13 ascertains that the base station selected by the receiver 11 is still the one that sends the signal with the greatest power value. Should there be no change in the most powerful signal, the transmitter 12 continues to send the signal 9. On the contrary, if there is a change in the most powerful signal, for example when there is change of a cell if the device 8 is in a mobile vehicle, then a new choice is made of a received candidate signal.

What is claimed is:

1. A method for the transmission of a radioelectric mobile telephony decoy signal according to a CDMA type access protocol, in a limited geographical zone, wherein:

a measurement is made, by means of a dummy receiver, in the limited geographical zone, of the power of one or more synchronization signals received in this limited geographical zone and transmitted by base stations of a mobile telephony network, a candidate signal is chosen from among the synchronization signals received for which the power value is the greatest in the limited geographical zone, the receiver is temporally synchronized with the chosen signal, a decoy signal that is the replica of the chosen signal is produced the decoy signal is amplified up to a power value that is strictly greater than a power value of the chosen signal, the decoy signal is sent inside the limited geographical zone by means of a dummy transmitter, the decoy signal being temporally desynchrorized with respect to the chosen signal and the other candidate radioelectric signals, a mobile telephone is radioelectrically connected with the dummy transmitter, the mobile telephone being inside the limited geographical zone.

2. Method according to claim 1 wherein there is a call request from a mobile telephone located in the limited geographical zone, the call request being received by the dummy receiver:

the mobile telephone is sent a report message indicating a temporary impossibility of routing the call request.

3. Method according to claim 1 wherein:

the dummy transmitter and the dummy receiver are placed in a vehicle, the dummy transmitter is activated when the vehicle is in motion and the dummy transmitter is deactivated when the vehicle is at a stop or if the mobile telephone is connected to a hands-free kit.

4. Device for the transmission of a mobile telephony radioelectric decoy signal in a limited geographical zone to be protected against acoustic nuisance from a mobile telephone, comprising a dummy receiver and a dummy transmitter sending said decoy signal that is desynchronized by temporal shift with respect to a received signal received by the dummy receiver and is more powerful than this received signal, said decoy signal preventing the mobile telephone from reacting to said received signal.

5. Device according to claim 4, wherein the limited geographical zone represents the volume of a body of a vehicle.

6. Device according to claim 5, wherein the volume represents a zone in which a driver of the vehicle is placed.

7. Device according to claim 4, comprising a detector of the movement of the vehicle.

8. Device according to claim 4, wherein the dummy transmitter comprises a sectorized and/or directional transmission antenna.

9. Device according to claim 4, wherein a volume of a limited geographical zone is demarcated by an electromagnetic shield and in that the dummy transmitter is inside this volume and the dummy receiver is outside this volume.

* * * * *